No. 890,166. PATENTED JUNE 9, 1908.
C. W. NEEDLES.
VEHICLE POLE.
APPLICATION FILED AUG. 31, 1907.
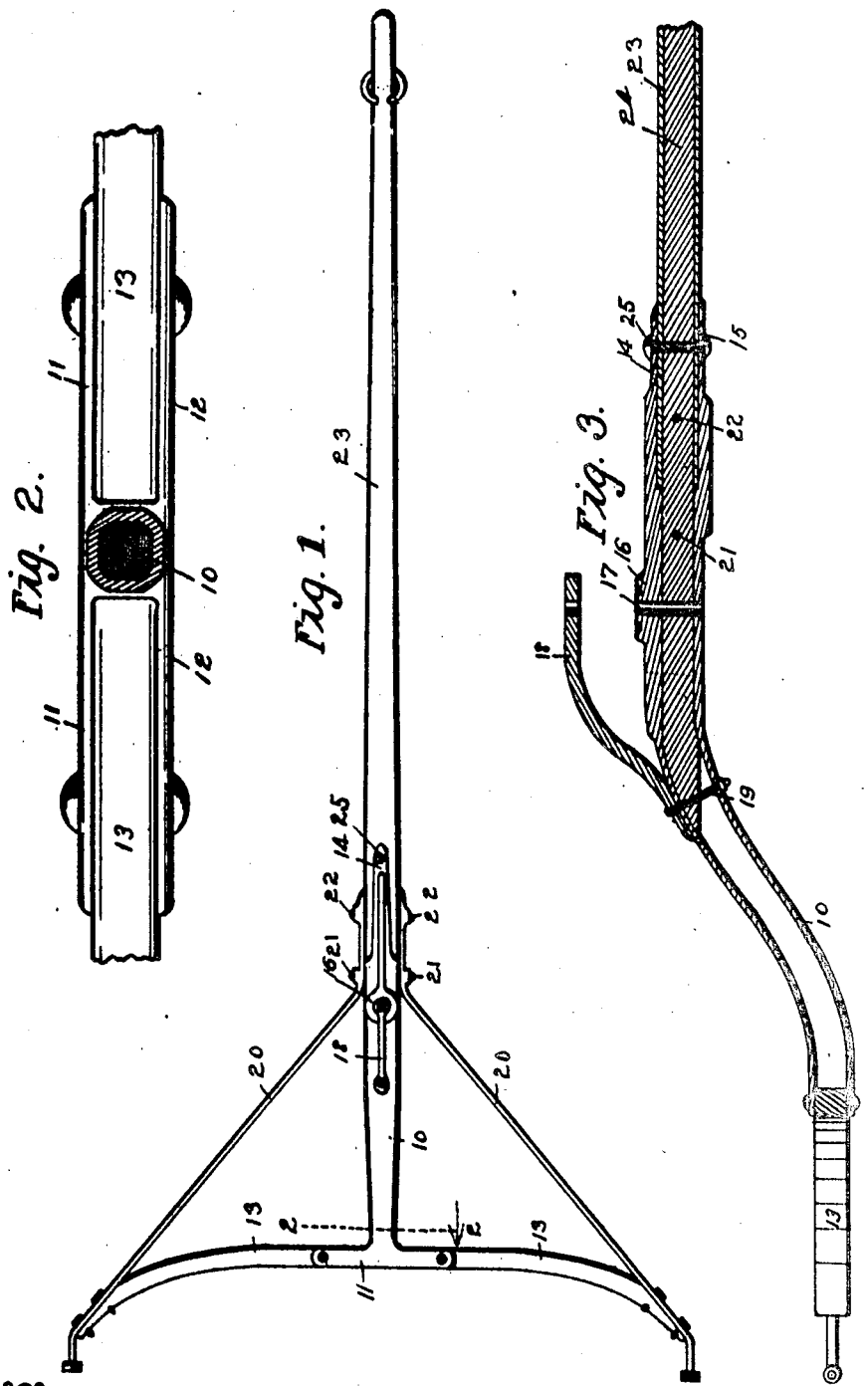
Witnesses.
F. C. Dahlberg.
N. E. Bennett.
Inventor.
C. W. Needles.
by Irving Lane Attys

UNITED STATES PATENT OFFICE.

CHARLES W. NEEDLES, OF ATLANTIC, IOWA.

VEHICLE-POLE.

No. 890,166.  Specification of Letters Patent.  Patented June 9, 1908.

Application filed August 31, 1907. Serial No. 390,925.

*To all whom it may concern:*

Be it known that I, CHARLES W. NEEDLES, a citizen of the United States, residing at Atlantic, in the county of Cass and State of Iowa, have invented a certain new and useful Vehicle-Pole, of which the following is a specification.

Poles for light vehicles are usually formed complete of a single piece of hickory or other strong and tough wood, the rear end of which is bent by a steaming process so as to elevate the pole body about a foot above the rear end thereof. These poles are very expensive, and are also frequently broken.
My object is to provide a vehicle pole of substantially the same size and shape as the vehicle poles now in use, and to construct the same of metal at the part in which the curve occurs, and of thin metal filled with wood at the straight body of the pole, and thus form a vehicle pole of light weight and strong and durable construction, at a cost much less than the cost of the wooden vehicle poles now in use, and also to provide a pole of this kind that is much less liable to breakage than the wooden poles now in use.

My invention consists in the construction, arrangement and combination of the various parts of the device, whereby the objects contemplated are attained, as hereinafter more fully set forth, pointed out in my claims, and illustrated in the accompanying drawings, in which—

Figure 1 shows a plan view of a vehicle pole embodying my invention. Fig. 2 shows an enlarged detail sectional view on the line 2—2 of Fig. 1, and Fig. 3 shows a longitudinal sectional view through the rear portion of the vehicle pole embodying my invention on an enlarged scale.

Referring to the accompanying drawings, I have first described the curved portion at the rear of the pole. This portion is preferably formed complete of one piece of metal, and it is also formed hollow. The body portion thereof is indicated by the numeral 10, and at its rear end is a top brace 11 and a bottom brace 12 at right angles to said body portion, to receive between them the wooden pole hound 13, which latter is of the ordinary construction. The upper or forward end of the body portion 10 is provided with a straight internal opening, and projecting beyond the upper portion thereof is a reinforcing strap 14, and on the bottom is another reinforcing strap 15. Formed on the top of the forward end of the part 10 is a raised lug 16 having a vertical opening 17 extended through it, and also through the bottom portion of the part 10 to receive a king bolt. A king bolt strap 18 is provided with its forward end above the opening 17, and its rear end connected by a bolt 19 with the body portion 10. Two brace rods 20 are provided with their rear ends connected to the outer ends of the pole hound 13, and their forward ends connected by a bolt 21 with the forward portion of the part 10, and by a bolt 22 with the forward portion of the pole beyond the body portion.

The forward portion of the pole is formed complete of a hollow sheet metal tube 23 tapered from its rear to its forward end, and filled with a wooden pole filler 24. This pole filler 24 also extends rearwardly into the body portion 10, as clearly shown in Fig. 3, the rear end of said filler being curved at its top to conform to the curved interior of the part 10, and being straight along its bottom so as to project as far as possible into the curved portion of the part 10, without the wood being curved itself. A bolt 25 is extended through the forward end of the strap 14 and through the sheet metal tube 23 and the wooden filler 24 to connect these parts together.

In assembling my improved vehicle pole, I first form the sheet metal cover 23. I then force the wooden filler 24 into it with the rear end of the filler projecting beyond the part 23. This wooden filler may be formed of cheap and inexpensive wood that does not need to have any great amount of strength or toughness, but is simply for the purpose of preventing the sheet metal cover 23 from becoming bent or buckled when subjected to strains. I also preferably force the wooden filler into the cover 23 with a considerable degree of pressure so that it fits accurately, and thus prevents the sheet metal cover 23 from becoming indented or buckled. I then place the vertical rear end of the wooden filler into the metal body portion 10, as shown in Fig. 3, and then insert the various bolts for connecting the straps 14 and 15 and the braces 20 with the two parts of the vehicle pole. By this arrangement the curved portion of the vehicle pole is made doubly strong. The upper body is also made stronger than the wooden pole body of the same size, and yet is of comparatively light weight, and at the same time is more rigid than a wooden pole. By extending the straps 14 and 15 over the sheet metal cover 23, and by having the braces 20 connected with both the parts 10 and 23, and also by having the wooden filler project through both the parts 10 and 23, the vehicle pole is made stronger at the joint between the forward and rear sections than at any other point. In this way I provide a vehicle pole that is stronger and more durable than a pole of similar size made out of the best wood, and at a cost far less than the cost of wooden vehicle poles, and I also provide a pole that is of only slightly greater weight than the wooden pole, the weight however, being contained almost wholly at the rear of the pole where it does not bear as heavily upon the draft animals as it would if the entire pole were made of metal.

Having thus described my invention, what I claim and desire to secure by Letters Patent of the United States, therefor, is

1. An improved vehicle pole comprising a hollow rear pole section, curved upwardly and then forwardly from its rear end, and formed with straps on its forward end at its top and bottom, a forward pole section comprising a sheet metal cover, a wooden filler in the cover, said wooden filler projected beyond the rear end of the sheet metal cover, and into the hollow rear pole section, its top edge at the rear end being curved and its lower edge straight, so that it may be extended a considerable distance into the rear pole section without being bent, said sheet metal cover on the forward pole section being extended between the straps on the rear pole section, and a bolt passed through said straps through the sheet metal cover, and through the wooden filler.

2. An improved vehicle pole comprising a hollow rear pole section, curved upwardly and then forwardly from its rear end and formed with straps on its forward end at its top and bottom, a forward pole section comprising a sheet metal cover, a wooden filler in the cover, said wooden filler projected beyond the rear end of the sheet metal cover, and into the hollow rear pole section, its top edge at the rear end being curved and its lower edge straight, so that it may be extended a considerable distance into the rear pole section without being bent, said sheet metal cover on the forward pole section being extended between the straps on the rear pole section, a bolt passed through said straps through the sheet metal cover, and through the wooden filler, braces at the sides of the pole, and bolts passed through said braces, one of them being extended through the forward pole section, the other through the rear pole section, both bolts being extended through the wooden filler.

Des Moines, Iowa, July 24, 1907.

CHARLES W. NEEDLES.

Witnesses:
M. E. BENNETT,
A. G. HAGUE.